United States Patent
Han

(10) Patent No.: US 8,391,369 B2
(45) Date of Patent: Mar. 5, 2013

(54) METHOD AND APPARATUS FOR ENCODING AND DECODING BASED ON INTRA PREDICTION

(75) Inventor: Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1448 days.

(21) Appl. No.: 12/016,457

(22) Filed: Jan. 18, 2008

(65) Prior Publication Data

US 2008/0175316 A1 Jul. 24, 2008

(30) Foreign Application Priority Data

Jan. 18, 2007 (KR) .................. 10-2007-0005804

(51) Int. Cl.
*H04N 7/12* (2006.01)

(52) U.S. Cl. ................. 375/240.24; 375/240.13

(58) Field of Classification Search .......... 382/232, 382/233, 236, 238, 239, 240, 248, 251; 375/240.12, 375/240.13, 240.14, 240.23, 240.24; 370/485–487
See application file for complete search history.

(56) References Cited

U.S. PATENT DOCUMENTS

| | | | | |
|---|---|---|---|---|
| 7,386,048 B2* | 6/2008 | Sun et al. | ............ | 375/240.15 |
| 7,813,432 B2* | 10/2010 | Wang | ............ | 375/240.24 |
| 7,830,960 B2* | 11/2010 | Liang et al. | ............ | 375/240.12 |
| 7,957,585 B2* | 6/2011 | Kim et al. | ............ | 382/162 |
| 8,085,845 B2* | 12/2011 | Tourapis et al. | ............ | 375/240.16 |
| 8,149,910 B2* | 4/2012 | Tanizawa et al. | ............ | 375/240.12 |
| 2005/0157797 A1 | 7/2005 | Gaedke | | |
| 2006/0153292 A1 | 7/2006 | Liang et al. | | |
| 2008/0107177 A1* | 5/2008 | Han et al. | ............ | 375/240.15 |
| 2008/0175317 A1* | 7/2008 | Han et al. | ............ | 375/240.12 |

FOREIGN PATENT DOCUMENTS

| | | |
|---|---|---|
| KR | 10-2006-0080184 A | 7/2006 |
| WO | 02/054779 A2 | 7/2002 |
| WO | 03/101117 A1 | 12/2003 |
| WO | 2004/080084 A1 | 9/2004 |

OTHER PUBLICATIONS

Bjontegaard, G., "H.26L Test Model Long Term No. 6 (TML-6) draft0", ITU—Telecommunications Standardization Sector Study Group 16, 2001, pp. 1-36, XP002971811.

Supplementary European Search Report issued Dec. 13, 2010 in counterpart European Application No. 08704561.3.

* cited by examiner

*Primary Examiner* — Hanh N Nguyen

(74) *Attorney, Agent, or Firm* — Sughrue Mion, PLLC

(57) ABSTRACT

Provided are a method and apparatus for encoding and decoding based on intra prediction. In the method, information regarding a direction of intra prediction of a current block is encoded into one of a plurality of values, depending on whether the directions of intra prediction of neighboring blocks that have been encoded before encoding the current block are identical to one another and whether the direction of intra prediction of the current block is identical to those of the neighboring blocks. Accordingly, it is possible to increase the compression rate of intra prediction encoding with a higher probability.

22 Claims, 6 Drawing Sheets

0 (VERTICAL)

1 (HORIZONTAL)

2 (DC)

3 (PLANE)

|  | VALUE | RATE OF BITS |
|---|---|---|
| P = min(A,L) | 1 | 1 |
| P! = min(A,L) | 0 XXX | 4 |

| | | VALUE | RATE OF BITS |
|---|---|---|---|
| min(A, L) = max(A,L) | P = min(A,L) | 1 | 1 |
| | P! = min(A,L) | 0 XXX | 4 |
| min(A, L) ! = max(A,L) | P = min(A,L) | 1 | 1 |
| | P = max(A,L) | 01 | 2 |
| | P! = min(A,L)<br>P! = min(A,L) | 00 YYY | 5 |

METHOD AND APPARATUS FOR ENCODING AND DECODING BASED ON INTRA PREDICTION

CROSS-REFERENCE TO RELATED PATENT APPLICATIONS

This application claims the benefit of Korean Patent Application No. 10-2007-0005804, filed on Jan. 18, 2007, in the Korean Intellectual Property Office, the disclosure of which is incorporated herein in its entirety by reference.

BACKGROUND OF THE INVENTION

1. Field of the Invention

The present invention relates to a method and apparatus for encoding and decoding based on intra prediction, and more particularly, to a method and apparatus for encoding a direction of intra prediction of a current block that is to be encoded while increasing the probability of predicting the direction of intra prediction by using neighboring blocks, thereby increasing the compression rate of encoding.

2. Description of the Related Art

In video compression methods, such as MPEG-1, MPEG-2, and MPEG-4H.264/MPEG-4 Advanced Video coding (AVC), a picture is divided into macro blocks in order to encode the picture. Next, each of the macroblocks is encoded using inter prediction and intra prediction. Then, an optimal encoding mode is selected in consideration of the data sizes of the encoded macro blocks and the extent of degradation of the original macro blocks, and the macro blocks are encoded in the optimal coding mode.

In intra prediction, a current block of a current picture is encoded using the values of pixels that are spatially adjacent to the current block, rather than referring to a reference picture. First, a prediction value of the current block is calculated using the values of the adjacent pixels. Next, only the difference between the prediction value and a pixel value of the original current block is encoded. Here, an intra prediction mode is largely classified into a 4×4 intra prediction mode, an 8×8 intra prediction mode, and a 16×16 intra prediction mode according to luminance components; and an intra prediction mode according to color difference components.

FIG. 1 illustrates conventional 16×16 intra prediction modes. Referring to FIG. 1, the conventional 16×16 intra prediction modes include four modes: a vertical mode, a horizontal mode, a direct current (DC) mode, and a plane mode.

FIG. 2 illustrates conventional 4×4 intra prediction modes. Referring to FIG. 2, the conventional 4×4 intra prediction modes include 9 modes: a vertical mode 0, a horizontal mode 1, a direct current (DC) mode 2, a diagonal down-left mode 3, a diagonal down-right mode 4, a vertical right mode 5, a vertical left mode 6, a horizontal-up mode 7, and a horizontal-down mode 8.

A prediction mode number indexed to each of the above modes is determined by the frequency of use of the mode. Statistically, the vertical mode 0 is most frequently used so as to perform intra prediction on a target block, and the horizontal-up mode 8 is least frequently used.

For example, a method of performing prediction encoding on a 4×4 current block according to the vertical mode 0 will be described. First, pixel values of the 4×4 current block are predicted using the values of pixels A through D adjacent to the top of the 4×4 current block. That is, 4 pixel values of the first column of the 4×4 current block are predicted using the value of the pixel A, 4 pixel values of the second column of the 4×4 current block are predicted using the value of the pixel B, 4 pixel values of the third column of the 4×4 current block are predicted using the value of the pixel C, and 4 pixel values of the fourth column of the 4×4 current block are predicted using the value of the pixel D. Next, the differences between each of the prediction values of the 4×4 current block, which are predicted using the pixels A through D, and each of actual values of pixels of the original 4×4 current block are calculated, and the differences are encoded, thereby generating a bitstream of the 4×4 current block.

According to the H.264 standard, a picture is encoded by encoding a current macro block in a total of 13 modes: the 4×4 intra prediction modes and the 16×16 intra prediction modes, and performing intra prediction encoding in one of the 13 modes, which is selected as the optimal mode. The optimal mode is selected in consideration of the residue and distortion between the original block and a predicted block.

In order to decode an intra prediction encoded bitstream, a receiving side that receives the bitstream must obtain information regarding a direction of intra prediction. To this end, the information regarding the direction of intra prediction is included in the bitstream during intra prediction encoding and the bitstream is transmitted to the receiving side. A predetermined encoding method is also used so as to reduce the bit rate when the information regarding the direction of intra prediction is included in the bitstream. Intra prediction encoding according to the H.264 standard will now be described.

FIGS. 3A and 3B illustrate a conventional method of encoding a direction of intra prediction. It is assumed that the number of an intra prediction mode of a current block 30 is P, the number of an intra prediction mode of an upper block 31 is A, and the number of an intra prediction mode of a left block 32 is L.

In video intra prediction encoding according to the H.264 standard, information regarding a direction of intra prediction of the current block 30 is encoded based on the directions of respective intra prediction of the upper block 31 and the left block 32. The upper block 31 and the left block 32 are neighboring blocks that have been encoded before encoding the current block 30, and each of them has a prediction mode number indicating the direction of intra prediction.

First, the number of the intra prediction mode of the current block 30 is compared with the minimum value of the prediction mode numbers of the upper block 31 and the left block 32.

If the minimum value is identical to the prediction mode number of the current block 30, the direction of intra prediction is encoded as "1" and the result of encoding is included in a bitstream. A receiving side that receives the bitstream determines the minimum value of the prediction mode numbers of the upper block 31 and the left block 32 as the prediction mode number of the current block 30, and decodes the bitstream in a direction of intra prediction, which corresponds to the prediction mode number of the current block 30. As described above, a prediction mode number is determined according to the frequency of use of each mode, and it is highly probable that a direction of predicting the current block 30 is similar to the directions of predicting neighboring blocks. Thus, it is highly probable that the minimum value of the prediction mode numbers of the neighboring blocks is identical to the prediction mode number of the current block. Therefore, the probability of expressing information regarding the direction of intra prediction of the current block 30 by using one bit is high, and the information is compressed based on the probability.

If the minimum value is not identical to the prediction mode number of the current block 30, "0" is inserted into the bitstream in order to indicate this fact. Since the prediction mode number of the current block 30 cannot be determined from the neighboring blocks in this case, the information regarding the direction of intra prediction is also inserted into the bitstream in the form of XXX, i.e., at the rate of 3 bits. Since there are 9 prediction mode numbers ranging from 0 to 8 and the minimum value is different from the prediction mode number of the current block 30, eight cases corresponding to the other prediction mode numbers excluding the minimum value are expressed with 3 bits. More specifically, when the prediction mode number of the current block 30 is less than the minimum value of the prediction mode numbers of the upper block 31 and the left block 32, a binary number of the prediction mode number of the current block 30 is in the form of XXX. However, when the prediction mode number of the current block 30 is greater than the minimum value, a value obtained by subtracting 1 from the binary number of the prediction mode number of the current block 30 is in the form of XXX.

In a conventional method, information regarding a direction of intra prediction of a current block is compressed only when the prediction mode value of the current block is identical to a minimum value of the prediction mode numbers of neighboring blocks. However, if they are not identical, the information regarding the direction of intra prediction is expressed with a total of 4 bits.

For example, it is assumed that a prediction mode 1 is used for the current block 30 of FIG. 3A, a prediction mode 0 is used for the upper block 31, and a prediction mode 1 is used for the left block 32. In this case, according to the conventional method, a minimum value of the prediction mode numbers is 0 and is thus not identical to the prediction mode number of the current block 30. Accordingly, the information of the direction of prediction must be expressed with 4 bits. That is, although the current block 30 uses the same prediction mode together with one of the neighboring blocks, the information regarding the direction of prediction is not compressed.

Accordingly, there is a need for a method and apparatus for encoding and decoding based on intra prediction, which are capable of compressing information regarding a direction of prediction with a higher probability than when using the conventional method.

SUMMARY OF THE INVENTION

The present invention provides a method and apparatus for encoding and decoding based on intra prediction, which are capable of effectively compressing information regarding a direction of intra prediction.

The present invention also provides a computer readable medium having recorded thereon a computer program for executing the above method.

According to an aspect of the present invention, there is provided a method of performing intra prediction encoding on a picture, the method comprising determining a direction of intra prediction of a current block by performing intra prediction on the current block, and generating a bitstream by performing intra prediction encoding in the determined direction; and encoding information regarding the direction of intra prediction of the current block into one of a plurality of values, depending on whether directions of intra prediction of neighboring blocks that have been encoded before encoding the current block are identical to one another and whether the direction of intra prediction of the current block is identical to the directions of intra prediction of the neighboring blocks; and inserting the encoded information into the bitstream.

The inserting of the encoded information may include inserting into the bitstream a value indicating that prediction mode numbers of the neighboring blocks are not identical to one another and that a prediction mode number of the current block is identical to a maximum value of the prediction mode numbers of the neighboring blocks, where each of the prediction mode numbers represents the direction of intra prediction of a corresponding block.

The inserting of the encoded information may include inserting into the bitstream a value indicating that prediction mode numbers of the neighboring blocks are not identical to one another and that a prediction mode number of the current block and the prediction mode numbers of the neighboring blocks are different from one another, where each of the prediction mode numbers represents the direction of intra prediction of a corresponding block.

According to another aspect of the present invention, there is provided an apparatus for performing intra prediction encoding on a picture, the apparatus including an intra prediction encoding unit determining a direction of intra prediction of a current block by performing intra prediction on the current block, and generating a bitstream by performing intra prediction encoding in the determined direction; and a direction information inserting unit encoding information regarding the direction of intra prediction of the current block into one of a plurality of values, depending on whether directions of intra prediction of neighboring blocks that have been encoded before encoding the current block are identical to one another and whether a direction of intra prediction of the current block is identical to those of the neighboring blocks; and inserting the result of encoding into the bitstream.

According to another aspect of the present invention, there is provided a method of performing intra prediction decoding on a picture, the method including receiving a bitstream containing the result of encoding information regarding a direction of intra prediction of a current block into one of a plurality of values, depending on whether directions of intra prediction of neighboring blocks that have been encoded before encoding the current block are identical to one another and whether a direction of intra prediction of the current block is identical to those of the neighboring blocks; determining the direction of intra prediction of the current block based on the information; and performing intra prediction decoding on the current block in the determined direction.

According to another aspect of the present invention, there is provided an apparatus for performing intra prediction decoding on a picture, the apparatus including a receiving unit receiving a bitstream containing the result of encoding information regarding a direction of intra prediction of a current block into one of a plurality of values, depending on whether directions of intra prediction of neighboring blocks that have been encoded before encoding the current block are identical to one another and whether a direction of intra prediction of the current block is identical to those of the neighboring blocks; a controller determining the direction of intra prediction of the current block based on the information; and an intra prediction decoding unit performing intra prediction decoding on the current block in the determined direction.

According to another aspect of the present invention, there is provided a computer readable medium having recorded thereon a computer program for executing the encoding method and the decoding method.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 4:
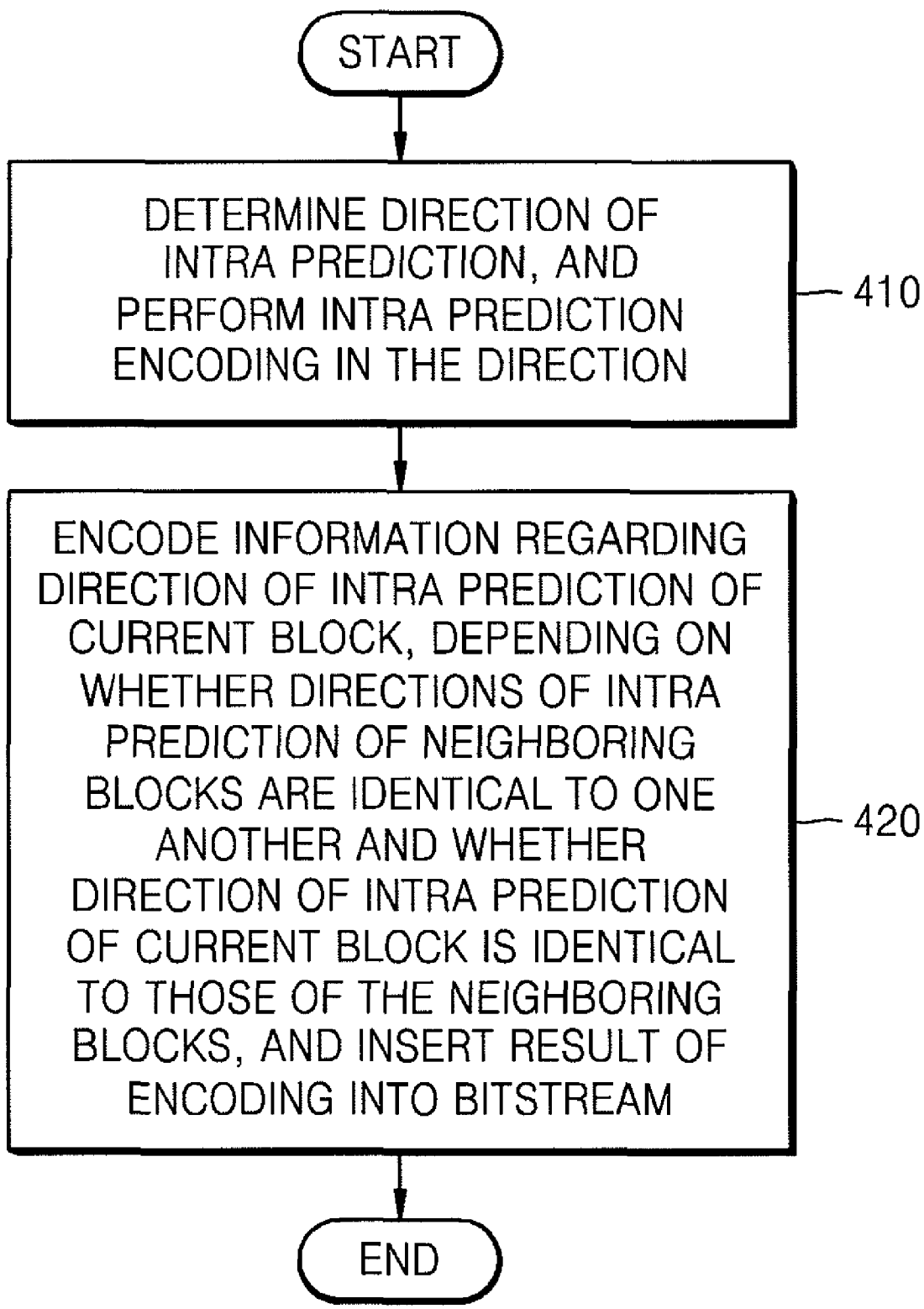
FIG. 4 is a flowchart illustrating an intra prediction-based encoding method according to an exemplary embodiment of the present invention.

FIG. 4 is a flowchart illustrating an intra prediction-based encoding method according to an exemplary embodiment of the present invention. Referring to FIG. 4, in operation 410, an intra prediction encoding apparatus according to an exemplary embodiment of the present invention ("the encoding apparatus") performs intra prediction on a current block and determines a direction of intra prediction of the current block. As described above, an optimal direction determined in consideration of a residue and distortion between the original block and a predicted block, is determined as the direction of intra prediction.

Figure 1:
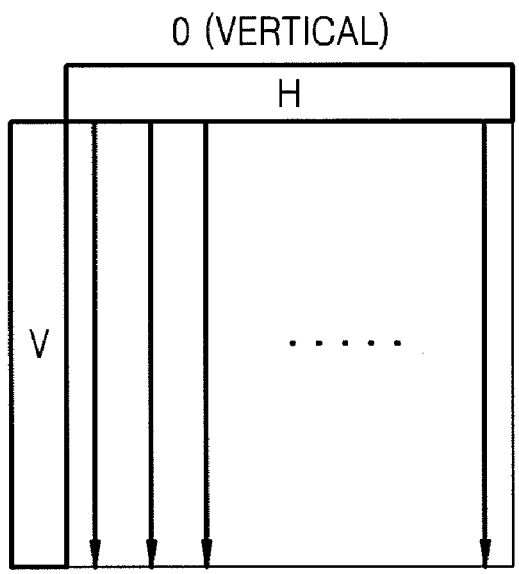
FIG. 1 illustrates conventional 16×16 intra prediction modes.
Figure 1:
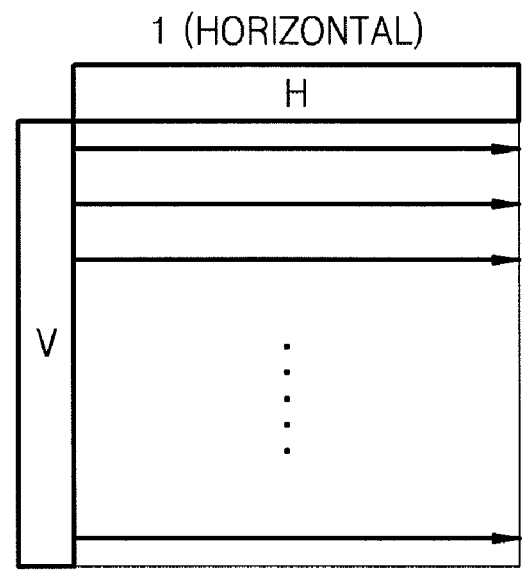
Figure 1:
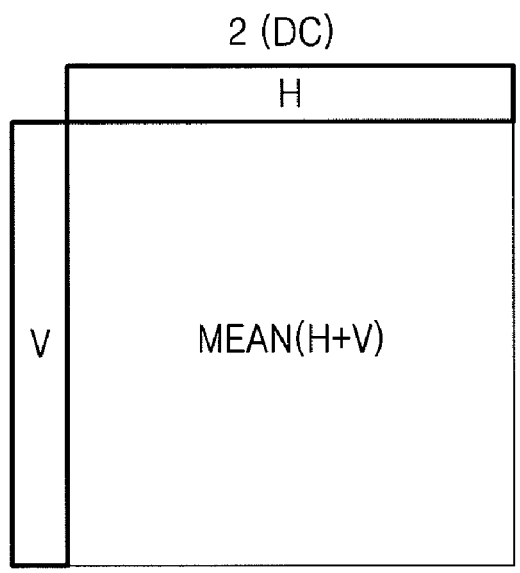
Figure 1:
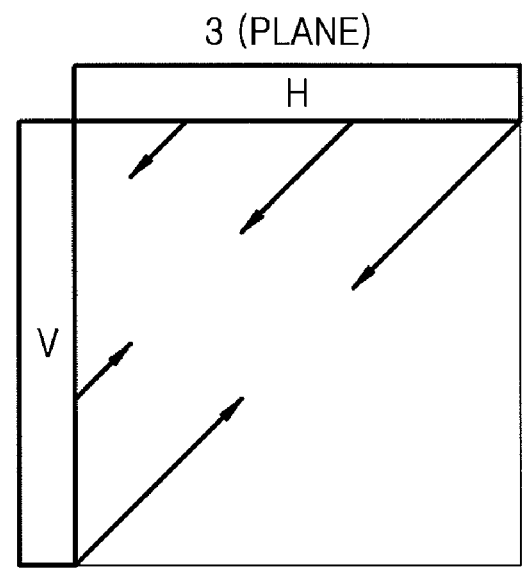
Figure 2:
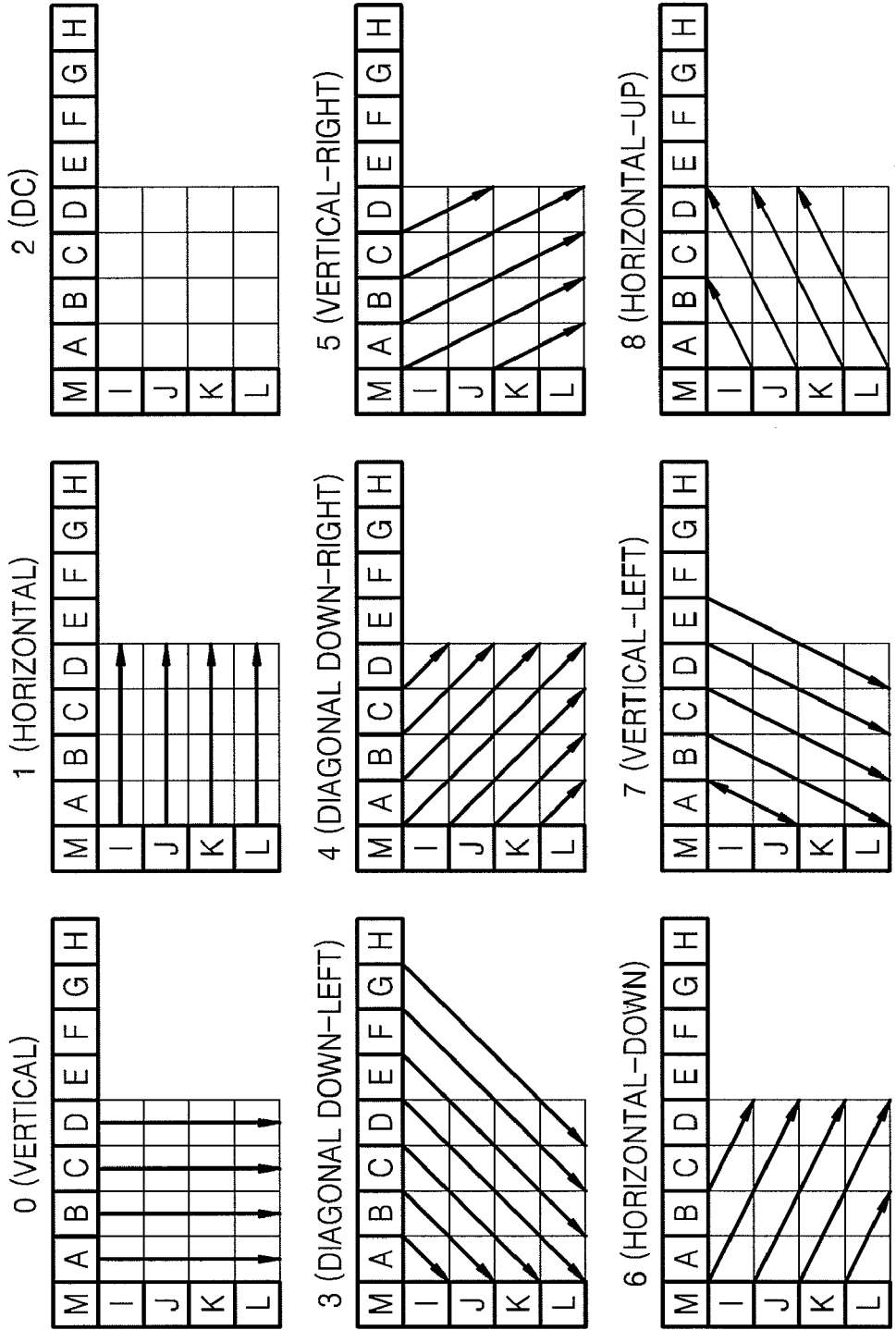
FIG. 2 illustrates conventional 4×4 intra prediction modes.

After determining the direction of intra prediction, intra prediction encoding is performed in the determined direction. As illustrated in FIGS. 1 and 2, a predicted block of the current block is generated using pixels of neighboring blocks of the current block. Then, discrete cosine transformation (DCT) is performed on the residue (difference value) between the original current block and the predicted block, and the result of performing the DCT is quantized so as to generate a bitstream of the current block.

In operation 420, the encoding apparatus encodes information regarding the direction of intra prediction of the current block, depending on whether the directions of performing intra prediction on the neighboring blocks are identical to one another and whether the direction of intra prediction of the current block is identical to the directions of performing intra prediction on the neighboring blocks.

The information regarding the direction of intra prediction of the current block is encoded, based on the directions of performing intra prediction on the neighboring blocks that have been encoded before encoding the current block and the direction of intra prediction of the current block, which is determined in operation 410. Here, the neighboring blocks may be an upper block adjacent to the top of the current block in a picture and a left block adjacent to the left side of the current block.

As described above with reference to FIG. 3B, in a conventional method of encoding a direction of intra prediction, information regarding a direction of intra prediction of a current block can be compressed and encoded only when a minimum value of the prediction mode numbers of neighboring blocks is identical to the prediction mode number of the current block. In other words, in the conventional method, the information regarding the direction of prediction on the current block is encoded by determining whether the prediction mode number of the current block is identical to the minimum value of the prediction mode numbers of the neighboring blocks without determining whether the prediction mode numbers of the neighboring blocks are identical to one another.

However, in an exemplary embodiment of the present invention, information regarding a direction of intra prediction is encoded into one of a plurality of values, depending on whether the directions of performing intra prediction on neighboring blocks are identical to one another (whether the prediction mode numbers of the neighboring blocks are identical to one another) and whether the direction of intra prediction of the current block is identical to the directions of performing intra prediction on the neighboring blocks (whether the prediction mode number of the current block is identical to the prediction mode numbers of the neighboring blocks). An exemplary embodiment of the present invention will be described in greater detail with reference to FIG. 5.

Figures 3A, 3B:
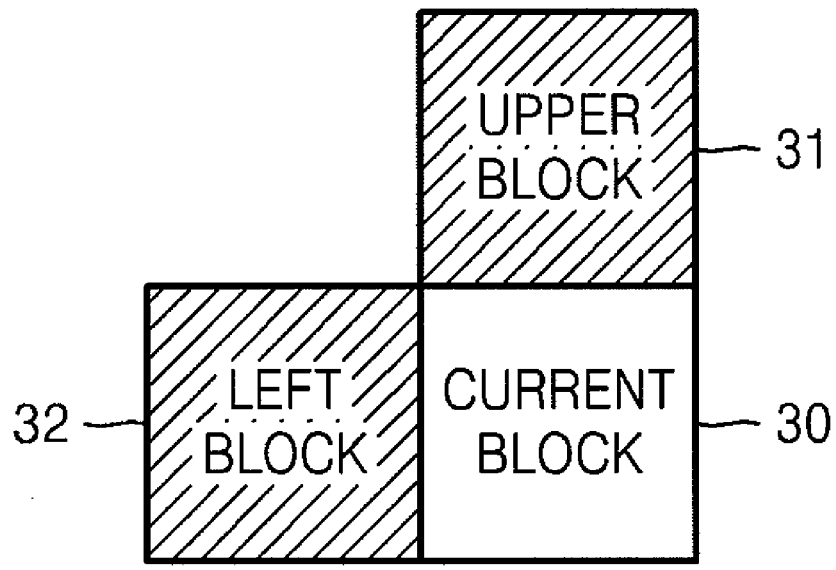
FIGS. 3A and 3B illustrate a conventional method of encoding a direction of intra prediction.
Figures 5, 6:
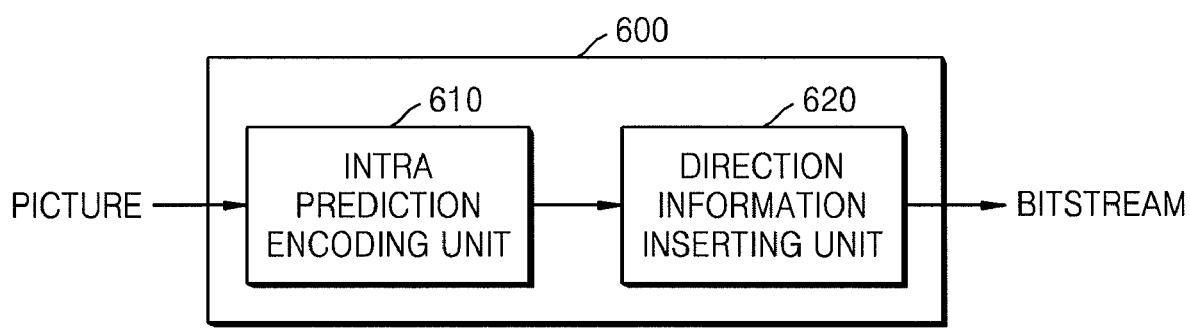
FIG. 5 is a table illustrating a method of encoding information regarding a direction of intra prediction according to an exemplary embodiment of the present invention.
FIG. 6 is a block diagram of an intra prediction-based encoding apparatus according to an exemplary embodiment of the present invention.

FIG. 5 is a table illustrating a method of encoding information regarding a direction of intra prediction according to an exemplary embodiment of the present invention. The method of FIG. 5 will be described with respect to a case where information regarding a direction of intra prediction of a current block 30 illustrated in FIG. 3A is encoded based on the directions of performing intra prediction on an upper block 31 and a left block 32. It is assumed that the intra prediction mode number of the current block 30 is P, the intra prediction mode number of the upper block 31 is A, and the intra prediction mode number of the left block 32 is L.

In the current exemplary embodiment of the present invention, information regarding a direction of intra prediction is encoded into one of a plurality of values for 5 cases, depending on whether the prediction mode numbers of the neighboring blocks are identical to one another, whether the direction of intra prediction of the current block is identical to the directions of performing intra prediction on the neighboring blocks, and whether the prediction mode number of the current block is identical to the prediction mode numbers of the neighboring blocks.

In the first case, min(A,L)=max(A,L) and P=min(A,L), that is, a maximum value and a minimum value of the prediction mode numbers of the upper block 31 and the left block 32 are the same. In other words, the prediction mode number of the upper block 31 is equal to that of the left block 32. However, since the prediction mode number of the current block 30 is equal to the minimum value, the information regarding the direction of intra prediction of the current block 30 is encoded as "1", similar to a conventional method.

In the second case, min(A,L)=max(A,L) and P!=min(A,L), that is, the maximum value and the minimum value of the prediction mode numbers of the upper block 31 and the left block 32 are the same. That is, the prediction mode number of the upper block 31 is equal to that of the left block 32. However, the prediction mode number of the current block 30 is not equal to the minimum value and the maximum value, and thus, the information regarding the direction of intra prediction of the current block 30 is encoded as "0" in order to express this fact, similar to the conventional method. Also, the prediction mode number of the current block 30 is expressed in the form of XXX, i.e., using 3 bits.

As in the conventional method, "XXX" denotes just a binary value of the prediction mode number of the current block 30 when the prediction mode number of the current block 30 is less than the minimum value, and denotes a binary value of a value obtained by subtracting 1 from the prediction mode number of the current block 30 when the prediction mode number of the current block 30 is greater than the minimum value.

In the third case, min(A,L)!=max(A,L) and P=min(A,L), that is, the minimum value and the maximum value of the prediction mode numbers of the upper block 31 and the left block 32 are not the same. That is, the prediction mode number of the upper block 31 is different from that of the left block 32. However, since the prediction mode number of the current block 30 is equal to the minimum value, the information regarding the direction of intra prediction is also encoded as "1", similar to the conventional method.

In the fourth case, min(A,L)!=max(A,L) and P=max(A,L), that is, the minimum value and the maximum value of the prediction mode numbers of the upper block 31 and the left block 32 are not the same. That is, the prediction mode number of the upper block 31 is different from that of the left block 32, and the prediction mode number of the current block 30 is equal to the maximum value. In this case, the information regarding the direction of prediction is encoded as "01" in order to express that the prediction mode number of the current block 30 is equal to the maximum value.

In the conventional method, the information regarding the direction of intra prediction is compressed only when the prediction mode number of a current block is equal to the minimum value of the prediction mode numbers of neighboring blocks. However, according to the present invention, the information regarding the direction of intra prediction can be expressed with only 2 bits even when the prediction mode number of the current block is equal to the maximum value of the prediction mode numbers of the neighboring blocks. That is, when the information regarding the direction of intra prediction is encoded according to the conventional method, the encoded information is expressed with 4 bits, including 0's that indicates that the prediction mode number of the current block is not equal to the minimum value and XXX that represents the information regarding the direction of intra prediction, but according to the present invention, the result of encoding the information can be expressed with only 2 bits.

In the fifth case, min(A,L)!=max(A,L), P!=min(A,L) and P!=max(A,L), that is, the prediction mode numbers of the upper block 31, the left block 32 and the current block 30 are all different from one another. In this case, the result of the direction of prediction is encoded as "00" in order to represent that the prediction mode number of the current block 30 is not identical to any one of those of the neighboring blocks. Also, the prediction mode number of the current block 30 is expressed in the form of YYY, i.e., with 3 bits.

In the fifth case, the prediction mode number of the current block 30 is not identical to the prediction mode numbers of the upper block 31 and the left block 32. Thus, the prediction mode number of the current block 30 is one of the other 7 numbers and therefore can be expressed with 3 bits.

Accordingly, as in the conventional method, YYY may be just a binary value of the prediction mode number of the current block 30 when the prediction mode number of the current block 30 is less than the minimum value, and a binary value of a value obtained by subtracting 1 from the prediction mode number when the prediction mode number of the current block 30 is greater than the minimum value.

Otherwise, YYY may be just a binary value of the prediction mode number of the current block 30 when the prediction mode number of the current block 30 is less than the maximum value, and a binary value of a value obtained by subtracting 1 from the prediction mode number when the prediction mode number of the current block 30 is greater than the maximum value.

YYY is preferably determined to be just a binary value of the prediction mode number of the current block 30 when the prediction mode number of the current block 30 is less than the minimum value, a binary value of a value obtained by subtracting 1 from the prediction mode number when the prediction mode number of the current block 30 is a value between the minimum value and the maximum value, and a binary value of a value obtained by subtracting 2 from the prediction mode number when the prediction mode number of the current block 30 is greater than the maximum value.

When the information regarding the direction of intra prediction is encoded as described above with reference to FIG. 5, the information that is conventionally expressed with 4 bits can be expressed with 2 bits, thereby reducing the bit rate. In this case, although the information that can be expressed with 4 bits in the fifth case is expressed with 5 bits thus increasing the bit rate, the effect of reducing the rate of bits obtained in the fourth case more than compensates for the fifth case. Since the current block 30 is likely to have similar properties to the neighboring blocks, the fourth case where the maximum value of the prediction mode numbers of the neighboring blocks is identical to the prediction mode number of the current block 30, is more likely to occur than the fifth case. Even if the probability of the occurrence of the fourth case is equal to that of the occurrence of the fifth case, 2 bits can be saved in the fourth case and only 1 bit is additionally used in the fifth case. Accordingly, it is possible to reduce the bit rate more significantly according to the present invention than according to the conventional method.

The cases and values illustrated in FIG. 5 are just illustrative, and it would be apparent to those of ordinary skill in the art that a method of encoding information regarding a direction of intra prediction according to whether the prediction mode numbers of the neighboring blocks are identical to one another and whether the prediction mode number of the current block is identical to the prediction mode numbers of the neighboring blocks falls within the scope of the present invention.

Referring to FIG. 4, in operation 420, the information regarding the direction of intra prediction, which is encoded as described above with reference to FIG. 5, is included in the bitstream generated in operation 410. That is, the encoded information is inserted into a flag field of the bitstream, which is set to include the information regarding the prediction mode of the current block 30.

FIG. 6 is a block diagram of an intra prediction-based encoding apparatus 600 according to an exemplary embodiment of the present invention. Referring to FIG. 6, the apparatus 600 includes an intra prediction encoding unit 610 and a direction information inserting unit 620.

The intra prediction encoding unit 610 performs intra prediction on the current block 30 in order to determine a direction of intra prediction of the current block 30, and performs intra prediction encoding in the determined direction, thereby generating a bitstream.

Specifically, an optimum direction determined in consideration of a residue and distortion between the original current block 30 and a predicted block is determined as the direction of intra prediction. After the direction of intra prediction is determined, intra prediction encoding is performed in the determined direction. Next, a predicted block of the current block 30 is generated using pixels of neighboring blocks of the current block 30, DCT is performed on the residue (difference value) between the original current block 30 and the predicted block, and the result of performing DCT is quantized, thereby generating a bitstream of the current block 30.

The direction information inserting unit 620 encodes information regarding the direction of intra prediction of the current block 30 into one of a plurality of values, depending on whether the directions of performing intra prediction on the neighboring blocks that have been encoded before encoding the current block 30 are identical to one another and whether the direction of intra prediction of the current block 30 is identical to the directions of performing intra prediction on the neighboring blocks; and then inserts the result of encoding into the bitstream generated by the intra prediction encoding unit 610. The result of encoding is preferably inserted into a flag field, of the bitstream, which is set to include the information regarding the intra prediction mode of the current block 30.

As described above with reference to FIG. 5, the information regarding the direction of intra prediction is encoded, depending on whether the prediction mode numbers of the neighboring blocks are identical to one another and whether the prediction mode number of the current block 30 is identical to those of the neighboring blocks.

Referring to FIG. 5, the information regarding the direction of intra prediction can be expressed with only 2 bits, not only when the prediction mode number of the current block 30 is identical to a minimum value of those of the neighboring blocks but also when the prediction mode number of the current block 30 is identical to a maximum value of those of the neighboring blocks. Accordingly, it is possible to encode the information regarding the direction of intra prediction with a higher rate of compression than when using the conventional method.

Figure 7:
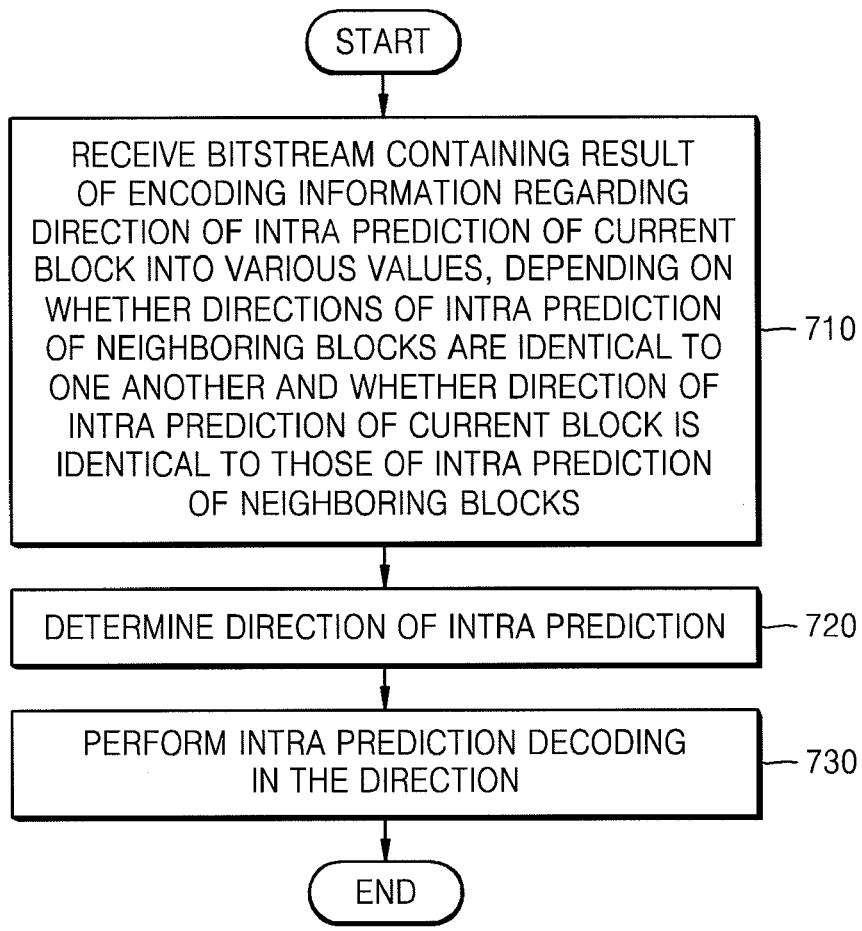
FIG. 7 is a flowchart illustrating an intra prediction-based decoding method according to an exemplary embodiment of the present invention.

FIG. 7 is a flowchart illustrating an intra prediction-based decoding method according to an exemplary embodiment of the present invention. Referring to FIG. 7, in operation 710, an intra prediction decoding apparatus according to the present invention ("the decoding apparatus") receives a bitstream containing the result of encoding information regarding a direction of intra prediction of a current block into one of a plurality of values, depending on whether the directions of performing intra prediction on neighboring blocks are identical to one another and whether the direction of intra prediction of the current block is identical to those of performing intra prediction on the neighboring blocks.

That is, the decoding apparatus receives the bitstream containing the information regarding the direction of intra prediction, which has been encoded into one of a plurality of values as described above with reference to FIG. 5, depending on whether the intra prediction mode numbers of the neighboring blocks are identical to one another and whether the prediction mode number of the current block is identical to those of the neighboring blocks.

In operation 720, the decoding apparatus determines the direction of intra prediction of the current block that is to be decoded, based on the information regarding the direction of intra prediction. The information regarding the direction of intra prediction, which has been encoded as described above with reference to FIG. 5, is included in a flag field of the bitstream. Therefore, the direction of intra prediction of the current block is determined by referring to the flag field.

In operation 730, the decoding apparatus performs intra prediction decoding in the direction determined in operation 720. Specifically, a predicted block of the current block is obtained by performing prediction in the direction determined in operation 720, and the residue (difference value) between the original current block and the predicted block is calculated by inversely quantizing the received bitstream and performing inverse DCT on the result of the inverse quantization. Next, the pixel values of the predicted block and the residue are combined so as to decode the original current block.

Figure 8:
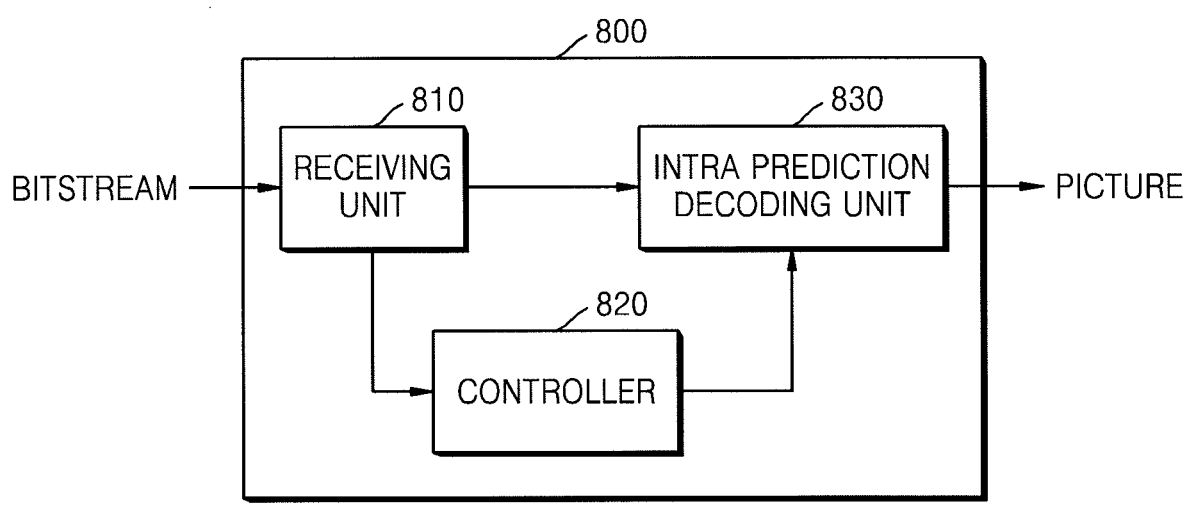
FIG. 8 is a block diagram of an intra prediction-based decoding apparatus according to an exemplary embodiment of the present invention.

FIG. 8 is a block diagram of an intra prediction-based decoding apparatus 800 according to an exemplary embodiment of the present invention. Referring to FIG. 8, the decoding apparatus 800 includes a receiving unit 810, a controller 820 and an intra prediction decoding unit 830.

The receiving unit 810 receives a bitstream containing the result of encoding information regarding a direction of intra prediction of a current block. Here, the information regarding the direction of intra prediction has been encoded into one of a plurality of values, depending on whether the directions of performing intra prediction on neighboring blocks are identical to one another and whether the direction of intra prediction of the current block is identical to those of performing intra prediction on the neighboring bocks, and then has been included in the bitstream. The information regarding the direction of intra prediction is preferably included in a flag field of the bitstream.

The controller 820 determines the direction of intra prediction of the current block that is to be decoded, based on the information regarding the direction of intra prediction, which is contained in the received bitstream. That is, the direction of intra prediction is determined by referring to the flag field containing the information regarding the direction of intra prediction of the current block.

The intra prediction decoding unit 830 performs intra prediction decoding in the direction determined by the controller 820. That is, a predicted block is obtained by performing prediction in the determined direction, and a residue (difference value) between the original current block and the predicted block is calculated by inversely quantizing the received bitstream and performing inverse DCT on the result of the inverse quantization. Then, the value of the predicted block and the residue are combined to decode the original current block.

The system according to the present invention can be embodied as computer readable code in a computer readable recording medium. The computer readable recording medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system.

According to the present invention, it is possible to reduce the bit rate necessary to encode information regarding a direction of intra prediction, not only when the prediction mode number of a current block is identical to a minimum value of the prediction mode numbers of neighboring blocks but also when the prediction mode number of the current block is identical to a maximum value of those of the neighboring blocks.

If the neighboring blocks are adjacent to the top and the left side, respectively, of the current block, it is possible to reduce the rate of bits necessary to encode the information regarding the direction of intra prediction when the direction of intra prediction of the current block is identical to at least one of the directions of intra prediction of the neighboring blocks.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of performing intra prediction encoding on a picture using a computer system, the method comprising:
    determining, by the computer system, a direction of intra prediction of a current block by performing intra prediction on the current block, and generating a bitstream by performing intra prediction encoding in the determined direction;
    encoding information regarding the direction of intra prediction of the current block into one of a plurality of values, depending on whether directions of intra prediction of neighboring blocks that have been encoded before encoding the current block are identical to each other and whether the direction of intra prediction of the current block is identical to the directions of intra prediction of the neighboring blocks; and
    inserting the encoded information into the generated bitstream.

2. The method of claim 1, wherein the inserting of the encoded information comprises inserting into the generated bitstream a value indicating that prediction mode numbers of the neighboring blocks are not identical to each other and that a prediction mode number of the current block is identical to a maximum value of the prediction mode numbers of the neighboring blocks, wherein the prediction mode number of the current block represents the direction of intra prediction of the current block and each of the prediction mode numbers of the neighboring blocks represents the direction of intra prediction of a corresponding one of the neighboring blocks.

3. The method of claim 1, wherein the inserting of the encoded information comprises inserting into the generated bitstream a value indicating that prediction mode numbers of the neighboring blocks are not identical to each other and that a prediction mode number of the current block and the prediction mode numbers of the neighboring blocks are different from each other, wherein the prediction mode number of the current block represents the direction of intra prediction of the current block and each of the prediction mode numbers of the neighboring blocks represents the direction of intra prediction of a corresponding one of the neighboring blocks.

4. The method of claim 3, wherein the inserting of the encoded information further comprises inserting a value indicating the direction of intra prediction of the current block into the generated bitstream.

5. The method of claim 1, wherein the neighboring blocks are adjacent to a top side and a left side of the current block in the picture.

6. The method of claim 1, wherein the current block is a 4×4 block.

7. A method of performing intra prediction decoding on an encoded picture using a computer system, the method comprising:
    receiving a bitstream containing a result of encoding information regarding a direction of intra prediction of a current block of said encoded picture into one of a plurality of values, depending on whether directions of intra prediction of neighboring blocks that have been encoded before encoding the current block of said encoded picture are identical to each other and whether the direction of intra prediction of the current block of said encoded picture is identical to the directions of intra prediction of the neighboring blocks;
    determining, by the computer system, the direction of intra prediction of the current block of said encoded picture based on the information; and
    performing intra prediction decoding on the current block of said encoded picture in the determined direction, to obtain a current block of a decoded picture.

8. The method of claim 7, wherein the bitstream comprises a value indicating that prediction mode numbers of the neighboring blocks are not identical to each other and that a prediction mode number of the current block of said encoded picture is identical to a maximum value of the prediction mode numbers of the neighboring blocks, wherein the prediction mode number of the current block represents the direction of intra prediction of the current block and each of the prediction mode numbers of the neighboring blocks represents the direction of intra prediction of a corresponding one of the neighboring blocks of said encoded picture.

9. The method of claim 7, wherein the bitstream comprises a value indicating that prediction mode numbers of the neighboring blocks are not identical to each other and that a prediction mode number of the current block of said encoded picture is not identical to the prediction mode numbers of the neighboring blocks, wherein the prediction mode number of the current block represents the direction of intra prediction of the current block and each of the prediction mode numbers of the neighboring blocks represents the direction of intra prediction of a corresponding one of the neighboring blocks of said encoded picture.

10. The method of claim 9, wherein the bitstream further comprises a value indicating the direction of intra prediction of the current block.

11. The method of claim 7, wherein the neighboring blocks are adjacent to a top side and a left side of the current block in the encoded picture.

12. The method of claim 7, wherein the current block is a 4×4 block.

13. An apparatus for performing intra prediction encoding on a picture, the apparatus comprising:
    an intra prediction encoding unit which determines a direction of intra prediction of a current block by performing intra prediction on the current block, and generates a bitstream by performing intra prediction encoding in the determined direction; and
    a direction information inserting unit which encodes information regarding the direction of intra prediction of the current block into one of a plurality of values, depending on whether directions of intra prediction of neighboring blocks that have been encoded before encoding the current block are identical to each other and whether the direction of intra prediction of the current block is identical to the directions of intra prediction of the neighboring blocks to generate a result, and inserts the result into the generated bitstream.

14. The apparatus of claim 13, wherein the direction information inserting unit inserts a value indicating that prediction mode numbers of the neighboring blocks are not identical to each other and that a prediction mode number of the current block is identical to a maximum value of the prediction mode numbers of the neighboring blocks, wherein the prediction mode number of the current block represents the direction of intra prediction of the current block and each of the prediction mode numbers of the neighboring blocks represents the direction of intra prediction of a corresponding one of the neighboring blocks.

15. The apparatus of claim 13, wherein the direction information inserting unit inserts a value indicating that prediction mode numbers of the neighboring blocks are not identical to each other and that a prediction mode number of the current block is not identical to the prediction mode numbers of the neighboring blocks, wherein the prediction mode number of the current block represents the direction of intra prediction of the current block and each of the prediction mode numbers of the neighboring blocks represents the direction of intra prediction of a corresponding one of the neighboring blocks.

16. The apparatus of claim 13, wherein the neighboring blocks are adjacent to a top side and a left side of the current block in the picture.

17. The apparatus of claim 13, wherein the current block is a 4×4 block.

18. An apparatus for performing intra prediction decoding on a picture, the apparatus comprising:
- a receiving unit which receives a bitstream containing a result of encoding information regarding a direction of intra prediction of a current block into one of a plurality of values, depending on whether directions of intra prediction of neighboring blocks that have been encoded before encoding the current block are identical to each other and whether the direction of intra prediction of the current block is identical to the directions of intra prediction of the neighboring blocks;
- a controller which determines the direction of intra prediction of the current block based on the information; and
- an intra prediction decoding unit which performs intra prediction decoding on the current block in the determined direction.

19. The apparatus of claim 18, wherein the bitstream comprises a value indicating that prediction mode numbers of the neighboring blocks are not identical to each other and that a prediction mode number of the current block is identical to a maximum value of the prediction mode numbers of the neighboring blocks, wherein the prediction mode number of the current block represents the direction of intra prediction of the current block and each of the prediction mode numbers of the neighboring blocks represents the direction of intra prediction of the corresponding one of the neighboring blocks.

20. The apparatus of claim 18, wherein the bitstream comprises a value indicating that prediction mode numbers of the neighboring blocks are not identical to each other and that a prediction mode number of the current block is not identical to the prediction mode numbers of the neighboring blocks, wherein the prediction mode number of the current block represents the direction of intra prediction of the current block and each of the prediction mode numbers of the neighboring blocks represents the direction of intra prediction of a corresponding one of the neighboring blocks.

21. The apparatus of claim 18, wherein the neighboring blocks are adjacent to a top side and a left side of the current block in the picture.

22. The apparatus of claim 18, wherein the current block is a 4×4 block.

* * * * *